May 8, 1928.
C. W. SCHIRMER ET AL
1,668,925
LIQUID LEVEL INDICATOR
Filed Dec. 3, 1921
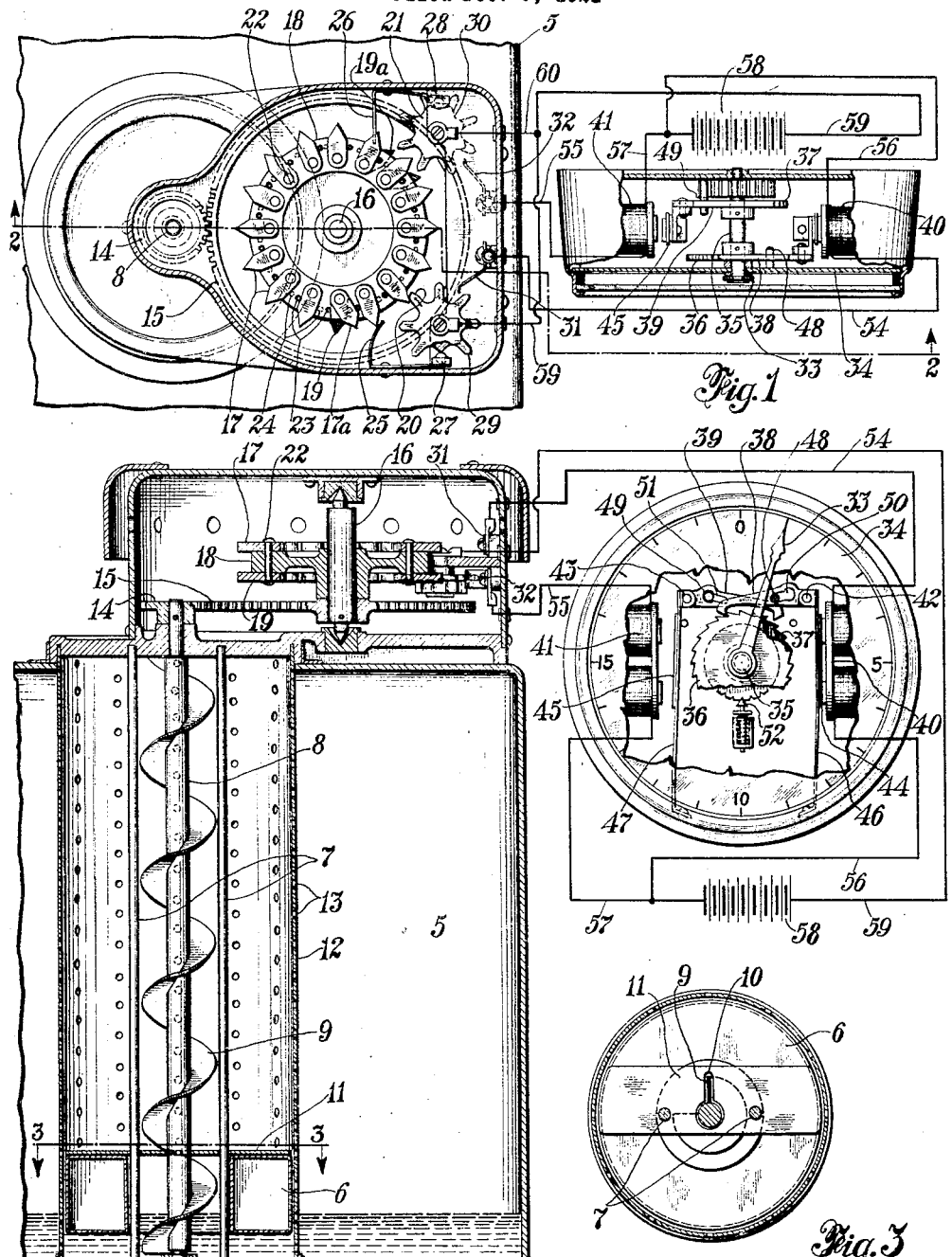
INVENTORS.
Charles W. Schirmer.
Howard P. Wood.
Dewitt D. Wood.
BY
C. W. Marshall
ATTORNEY Patented May 8, 1928.

1,668,925

UNITED STATES PATENT OFFICE.

CHARLES W. SCHIRMER, OF YONKERS, AND HOWARD P. WOOD AND DE WITT D. WOOD, OF POUGHKEEPSIE, NEW YORK.

LIQUID-LEVEL INDICATOR.

Application filed December 3, 1921. Serial No. 519,789.

The present invention is an apparatus for indicating the level or quantity of liquids and particularly the amount of liquid fuel in the gasoline tanks of automobiles.

Some of the more important objects of the invention are to provide simple, practical and accurate apparatus of this character, which can be readily installed and which will automatically indicate both the decreasing amount of liquid in a tank while the liquid is being used on the one hand, or, the increasing amount while the tank is being filled.

Further objects are to enable the placing of the indicator per se in such a position that it may be readily observed, as on the instrument board of an automobile and to so construct the electrical circuit controlling portion of the mechanism that there will be no wastage or excessive use of the current.

These objects are attained in the construction disclosed in the accompanying drawing forming part of this specification, and which is but one example of the form or structure in which the invention may be embodied.

Figure 1 in the drawing referred to is a part sectional and plan view of the apparatus with the wiring connections from the tank to the indicating mechanism shown diagrammatically.

Figure 2 is a vertical sectional view as taken on substantially the plane of line 2—2 of Figure 1.

Figure 3 is a horizontal sectional view of the float mechanism as on substantially the plane of line 3—3 of Figure 2.

The tank or liquid container is indicated in a general way at 5. Guided for vertical rising and falling movement within the tank is a float 6 which is held against rotation in this instance by riding over the guide rods 7. In its rising and falling movements this float imparts rotary motion to a shaft 8 through the medium of a spiral rib or flange 9 on the shaft sliding through a transverse slot 10 in the guide bar 11 on the top of the non-rotative float. The motion of this shaft serves to operate the control mechanism for the indicator.

A special feature of this mechanism is that the float is protected so that sudden surges of liquid within the tank will not affect the float and the mechanism operated thereby. This protection is provided in the present disclosure by a wall or casing 12 surrounding and enclosing the float and perforated as indicated at 13 so as to permit passage of liquid and yet afford a sufficient barrier to prevent sudden surges of liquid from materially affecting the level within the float chamber.

This construction causes the liquid level within the float chamber to represent the general level within the tank irrespective of sudden fluctuations or surges, such as might be caused by the jolting of an automobile fuel tank.

The drive shaft carries at its upper end, in the illustration, a pinion 14 meshing with a gear 15 on shaft 16 which carries the control elements.

In the structure illustrated in Figures 1 and 2 the control is effected by a series of pivoted dogs or lugs 17 on the upper face of the carrier wheel 18 and a series of reversely operating dogs 19 on the lower face of said carrier wheel, the first set of dogs operatively cooperating with a contact controlling star wheel 20 when the control shaft rotates in one direction and the second set of dogs operating a second circuit controlling star wheel 21 when the control shaft rotates in reverse direction. These two sets of dogs or pawls are shown as pivoted at the opposite sides of the carrier wheel on the pins 22, the upper set having their swinging motion in one direction limited so that they will stand out radially from the wheel by stops in the form of pins 23 and the lower set having their swinging motion in the reverse direction limited by a set of stop pins 24.

This construction it will be seen causes the upper set of dogs 17 to stand and operatively engage the star wheel 20 when the control wheel rotates in a counter-clockwise direction in Figure 1, and the lower set of dogs to operate the star wheel 21 when the control shaft rotates in the reverse or clockwise direction. It will also be seen that when the control shaft rotates clockwise, the upper set of dogs will swing back on contact with the star wheel into the retracted position shown at 17$^a$ and thus not operate said star wheel, whereas, when the shaft rotates in the reverse or counter-clockwise direction, the lower dogs will drop back as indicated at 19$^a$ and hence fail to operate the star wheel 21. When the control shaft rotates counter-clockwise, an inwardly projecting spring finger 25 engages the points of the dogs 17 and turns them outwardly into projected position ready to operate the first star wheel, and a similar spring arm 26 is provided for restoring the lower set of dogs 19 on the reverse rotation of the shaft.

The star wheels are held against accidental movement and are caused to turn with a step by step snap action by the spring pressed pawls or thrust elements 27, 28 engaged with the relatively sharply pointed teeth 29, 30 on the backs of such wheels.

The circuit making devices, in the illustration, are the star wheels themselves, which as they are turned, snap over the spring contact arms 31 and 32 respectively.

The parts are so related that the star wheels cannot dwell or come to rest on these spring contacts, the engagement being only momentarily in each instance by reason of the snapping impulses imparted to the star wheels by the spring elements 27 and 28.

The reading or indication is provided in the present disclosure by a pointer 33 traveling over a suitably graduated scale 34. This pointer is shown as carried by a shaft 35 having reversely faced ratchets 36 and 37 positioned for engagement by the reversely acting pawls 38, 39 which are operated by electromagnets 40 and 41 respectively. These pawls are pivotally connected at 42 and 43 with the armatures 44 and 45 respectively of the two magnets, which armatures are shown as yieldingly carried by the upstanding spring arms 46, 47, which are tensioned to normally hold the armatures retracted, as at the left in Figure 2. Guide pins 48 and 49 extending through inclined slots 50, 51 in the pawls control movement of the pawls toward and away from their respective ratchets, causing them to be lifted from engagement with their ratchets when the armatures are released and to be swung on their pivots down into engagement with their ratchets when the armatures are attracted.

These conditions are both shown in Figures 1 and 2, where the star wheel 20 has just closed the circuit through the magnet 40 and said magnet has attracted its armature, thereby has thrown the pawl 38 down into engagement with ratchet 36 and has advanced the pointer one step in a clockwise direction; the armature 45 of the other magnet meanwhile standing in retracted position and the pawl 39 being thereby supported free of engagement with its ratchet 37.

The dial shaft 35 is shown as yieldingly held in the positions to which it may be turned by a spring pressed plunger 52 which engages a toothed holding wheel 53 on said shaft.

The circuit connections consist in the illustration of conductors 54, 55 extending from contacts 31, 32 to the magnets 40 and 41 respectively, said magnets being connected by wiring 56, 57 with one side of the battery 58 or other source of energy, which battery is shown as connected by wiring 59, 60 with the two star wheels.

Operation.

It will be apparent that as the body of liquid within the tank is increased or decreased in volume the float will rise or fall and will through the gearing shown impart rotative movement to the control wheel either in a counter-clockwise or a clockwise direction. In the first mentioned movement, the dogs 17 will be active and the dogs 19 will be inactive with the result that at each impulse imparted to the star wheel 20, sufficient to cause it to snap past the dead centers of the holding teeth 29, contact will be made with the spring 31 so as to close circuit through magnet 40, whereby armature 44 is attracted and pawl 38 is thrown down into engagement with its ratchet 36 and the index pointer is shifted one step toward the right so as to show that the liquid is rising in the tank. This step by step indication will proceed so long as the liquid is being supplied.

As the tank is emptied, for example, by consumption of liquid fuel, the control wheel will be rotated in the reverse or clockwise direction, and the dogs 19 then becoming active, will turn the star wheel 21 which will intermittently and momentarily establish contact for the circuit through magnet 41, which attracting its armature will shift the index pointer step by step in a manner to indicate the lowering of liquid within the tank. Between such shifting movements, the pointer will stand at rest, being yieldingly held so by the spring pressed plunger 52. This obviates any question of the pointer being accidentally shifted by vibration.

As the circuits through the magnets are closed only momentarily and the switches are of such a nature that the contacts cannot remain in engagement, there is no wastage of current. The only connections between the tank mechanism and the indicator instrument are electrical so that the latter instrument may be located at a remote point and within convenient view, as upon the instrument board of a vehicle.

What we claim is:

1. Float actuated mechanism for liquid level indicators comprising a float, a pair of momentary-contact snap switches, means operable to actuate one of said switches upon a slight movement of the float in one direction and means operable to actuate the other of said switches upon a similar movement of the float in the other direction, said switch actuating mechanism including a rotary carrier wheel with two sets of pivoted dogs, one set having stops to hold the same in outstanding relation when the carrier wheel rotates in one direction and the other set having stops to retain the same in outstanding relation when the carrier wheel rotates in the reverse direction.

2. Float actuated mechanism for liquid level indicators comprising a float, a pair of momentary-contact snap switches, means operable to actuate one of said switches on the movement of the float in one direction and means operable to actuate the other of said switches on the movement of the float in the other direction, said switch actuating mechanism including a rotary carrier wheel with two sets of pivoted dogs, one set having stops to hold the same in outstanding relation when the carrier wheel rotates in one direction and the other set having stops to retain the same in outstanding relation when the carrier wheel rotates in the reverse direction and spring-impelled star wheels positioned for engagement each by one set of pivoted dogs.

3. Float actuated mechanism for liquid level indicators comprising a float, a pair of momentary-contact snap switches, means operable to actuate one of said switches upon a slight movement of the float in one direction and means operable to actuate the other of said switches upon a similar movement of the float in the other direction, said switch actuating mechanism including a rotary carrier wheel with two sets of pivoted dogs, one set having stops to hold the same in outstanding relation when the carrier wheel rotates in one direction and the other set having stops to retain the same in outstanding relation when the carrier wheel rotates in the reverse direction, and spring actuated means for moving said dogs against their respective stops in advance of their switch actuating positions.

4. Float actuated mechanism for liquid level indicators comprising a float, a pair of momentary-contact snap switches, means operable to actuate one of said switches on the movement of the float in one direction and means operable to actuate the other of said switches on the movement of the float in the other direction, said switch actuating mechanism including a rotary carrier wheel with two sets of pivoted dogs, one set having stops to hold the same in outstanding relation when the carrier wheel rotates in one direction and the other set having stops to retain the same in outstanding relation when the carrier wheel rotates in the reverse direction and spring-impelled star wheels positioned for engagement each by one set of pivoted dogs, and spring actuated means for moving said dogs against their respective stops in advance of their switch actuating positions.

In witness whereof, we have hereunto set our hands, this 26 day of November, 1921.

CHAS. W. SCHIRMER.
HOWARD P. WOOD.
DE WITT D. WOOD.